US011946615B2

(12) United States Patent
Thijssen et al.

(10) Patent No.: US 11,946,615 B2
(45) Date of Patent: Apr. 2, 2024

(54) LUMINAIRE COMPRISING IDENTICAL, CURVED LED MODULES AND LED MODULE SUITABLE FOR SAID LUMINAIRE

(71) Applicant: SIGNIFY HOLDING B.V., Eindhoven (NL)

(72) Inventors: Johannes Maria Thijssen, Best (NL); Andreas Aloysius Henricus Duijmelink, Aale-Rixtel (NL); Silvia Maria Booij, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/793,016

(22) PCT Filed: Jan. 12, 2021

(86) PCT No.: PCT/EP2021/050481

§ 371 (c)(1),
(2) Date: Jul. 14, 2022

(87) PCT Pub. No.: WO2021/148279

PCT Pub. Date: Jul. 29, 2021

(65) Prior Publication Data

US 2023/0054900 A1 Feb. 23, 2023

(30) Foreign Application Priority Data

Jan. 20, 2020 (EP) .................................... 20152691

(51) Int. Cl.
*F21S 8/00* (2006.01)
*F21V 5/00* (2018.01)
(Continued)

(52) U.S. Cl.
CPC ................ *F21S 8/03* (2013.01); *F21V 5/007* (2013.01); *F21Y 2103/30* (2016.08); *F21Y 2105/12* (2016.08); *F21Y 2115/10* (2016.08)

(58) Field of Classification Search
CPC ........ F21S 8/03; F21V 5/007; F21Y 2103/30; F21Y 2105/12
See application file for complete search history.

(56) References Cited

U.S. PATENT DOCUMENTS 8,585,242 B2 * 11/2013 Walczak .................. F21S 4/00 362/249.02
9,022,600 B2 * 5/2015 Mizuta ................. F21V 14/003 362/373
(Continued)

FOREIGN PATENT DOCUMENTS

CN 103672637 B 5/2016
DE 102009050700 A1 5/2011
(Continued)

*Primary Examiner* — Evan P Dzierzynski

(57) ABSTRACT

A luminaire (1) comprising identical curved LED Modules (13, 13', 13") in an inner and an outer arrangement of LED Modules. Said LED Module comprising a curved PCB (14) having a main surface and a number of LEDs (15) arranged thereon. The LED Module has width W and is curved with its main surface extending in a plane Q. The LED Module extends over a circle with a radius Rc, wherein 200 mm<=Rc<=450 mm, and extends over an angle a over said circle, wherein 36°<=a<=72°. The number of LEDs is in between 3 and 150. Each LED (15) has a respective dough-nut like shaped lens to render the LED during operation to emit a rotational symmetric batwing beam with a maximum intensity Imax of the batwing beam at an angle 13 with 60°<=13<=80° with said optical axis, and a FWHM in the range of 15-30°.

16 Claims, 7 Drawing Sheets

(51) Int. Cl.

| | |
|---|---|
| *F21Y 103/30* | (2016.01) |
| *F21Y 105/12* | (2016.01) |
| *F21Y 115/10* | (2016.01) |

(56) References Cited

U.S. PATENT DOCUMENTS

| | | | | |
|---|---|---|---|---|
| 9,791,116 | B2 * | 10/2017 | Mrakovich | F21S 2/005 |
| 2007/0201225 | A1 | 8/2007 | Holder et al. | |
| 2007/0242441 | A1 * | 10/2007 | Aldrich | H05K 1/111 361/782 |
| 2008/0212316 | A1 * | 9/2008 | Routledge | F21V 15/01 362/227 |
| 2008/0273324 | A1 | 11/2008 | Becker et al. | |
| 2010/0027281 | A1 | 2/2010 | Waters et al. | |
| 2011/0188241 | A1 * | 8/2011 | Walczak | F21V 5/00 362/249.02 |
| 2012/0057344 | A1 * | 3/2012 | Wang | F21V 29/763 362/235 |
| 2012/0224364 | A1 * | 9/2012 | Mizuta | F21S 8/04 362/249.02 |
| 2012/0268943 | A1 | 10/2012 | Walczak et al. | |
| 2014/0160766 | A1 * | 6/2014 | Chinniah | F21V 7/0091 362/308 |
| 2016/0290603 | A1 | 10/2016 | Morello et al. | |
| 2016/0348862 | A1 | 12/2016 | Liang et al. | |

FOREIGN PATENT DOCUMENTS

| | | | |
|---|---|---|---|
| EP | 2562474 | A2 | 2/2013 |
| EP | 3203135 | A1 | 8/2017 |
| JP | 2018037177 | A | 3/2018 |
| JP | 2018181602 | A | 11/2018 |
| WO | 2017029286 | A1 | 2/2017 |

* cited by examiner

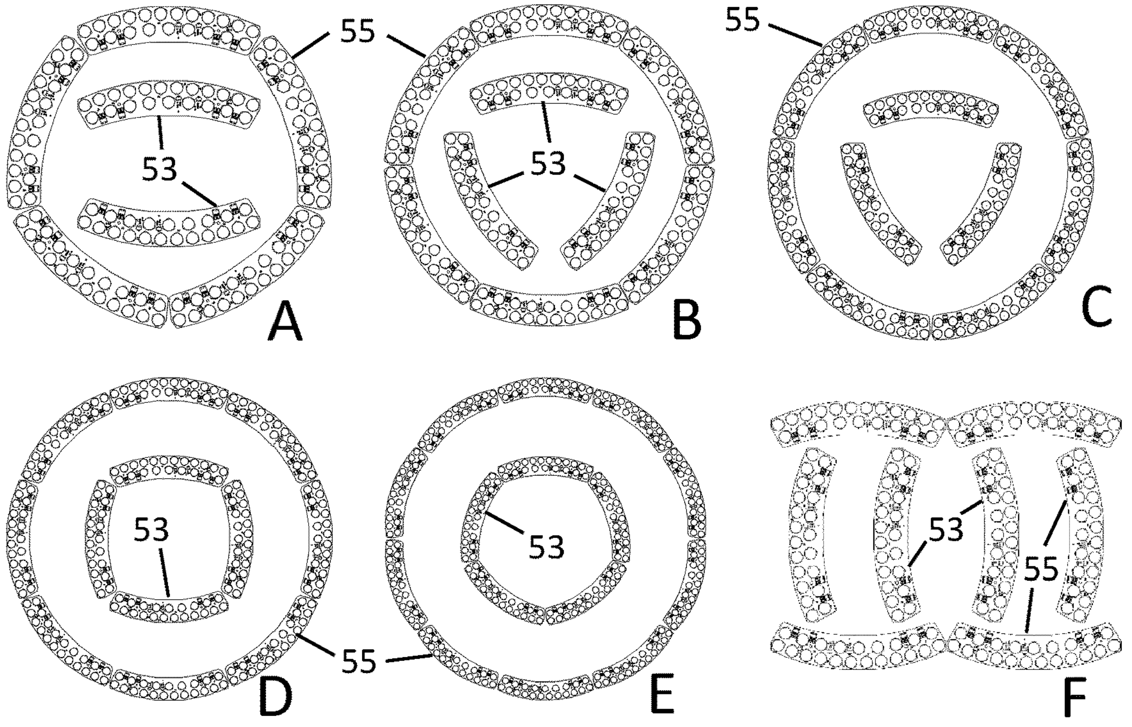
FIG. 9A-F
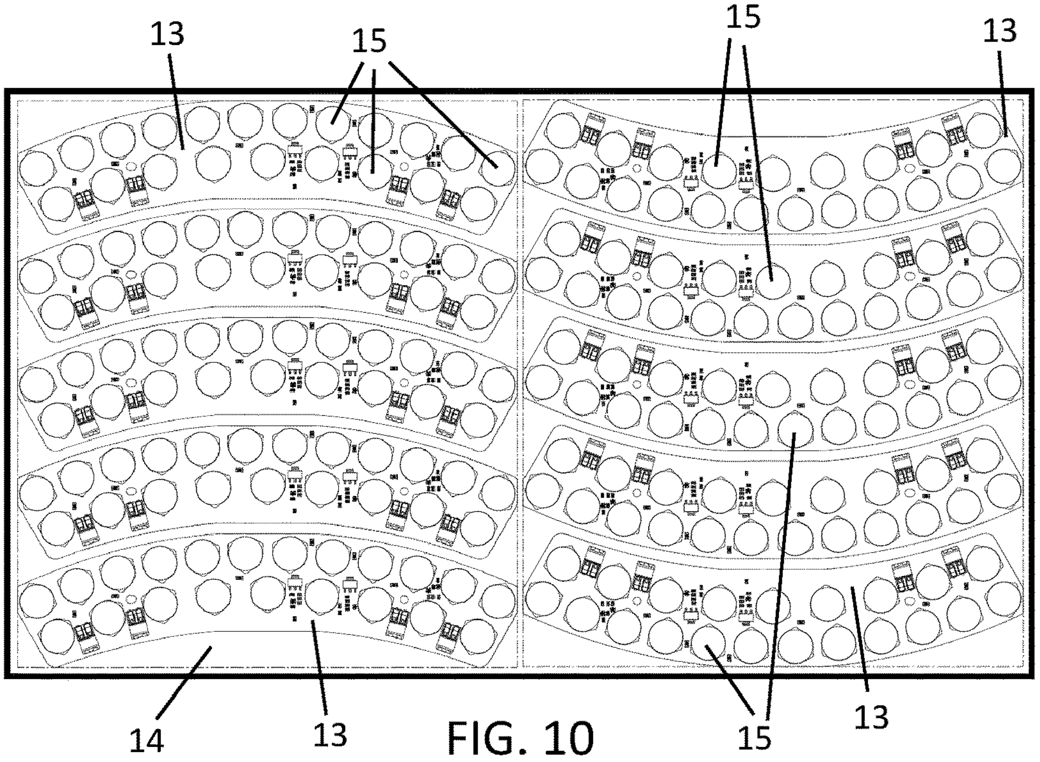
FIG. 10

LUMINAIRE COMPRISING IDENTICAL, CURVED LED MODULES AND LED MODULE SUITABLE FOR SAID LUMINAIRE

CROSS-REFERENCE TO PRIOR APPLICATIONS

This application is the U.S. National Phase application under 35 U.S.C. § 371 of International Application No. PCT/EP2021/050481, filed on Jan. 12, 2021, which claims the benefit of European Patent Application No. 20152691.0, filed on Jan. 20, 2020. These applications are hereby incorporated by reference herein.

FIELD OF THE INVENTION

The invention relates to a luminaire according to the invention comprising a plurality of identical, curved LED Modules, The invention further relates to a LED Module suitable for being applied in a luminaire according to the invention.

BACKGROUND OF THE INVENTION

Functional Ceiling luminaires in Asia, also called center pieces, are typically diffuse luminaires with a large diameter, for example up to about 850 mm diameter, and with a relatively low thickness, i.e. less than about 100 mm total thickness. There are several options to make a desired, uniform luminance on the diffuser that is positioned in the light exit window of the luminaire. A commonly used solution is using a LED Module comprising a PCB mounted with a relatively low number of LEDs in combination with lenses that make the intensity distribution of the LEDs wider. Such a LED Module is typically referred to as L2 Module or as L2 LED Module. Suitable lenses to serve this purpose are known as batwing lens or TV-lens, which are/were typically used in TV backlighting. The lenses can be provided as a large integral lens plate or in that each LED has an individual, separate lens. A large integral lens plate has the disadvantage of misalignment between a LED and its associated lens, for example due to thermal expansion differences. Furthermore, tooling costs for these large lens plates are relatively high and relatively heavy machines are required. Even furthermore, these known LED Modules have the disadvantage of an inhomogeneous illumination of the light exit window of a luminaire. A simple alternative is to mount a relatively large number of LEDs on a large PCB. This renders the luminaire to have a homogeneous illumination of the light exit window, but to make said uniform luminance on large luminaires relatively large PCB areas with many LEDs are required, typically much more than required for the light output. This has the disadvantage that manufacture of a luminaire is laborious and relatively expensive.

SUMMARY OF THE INVENTION

It is an object of the invention to provide a PCB-LEDs-optics combination, i.e. an LED Module, and a luminaire comprising a plurality of said LED Modules in which the disadvantages of the known devices are counteracted. Thereto the luminaire comprises a housing with a base having a first carrier surface on which a plurality of LED Modules is arranged, and opposite to said first carrier surface a cover arranged in a light exit window of the luminaire, wherein the LED Module is a curved LED Module comprising a curved PCB having a main surface on which a number of N LEDs are mounted, wherein the LEDs are facing towards the light exit window and are screened by said cover, wherein the LED Modules are arranged as to comprise and inner arrangement of LED Modules surrounded by an outer arrangement of LED Modules, and wherein all LED Modules are identical.

In prior art devices each luminaire in which inner arrangements and outer arrangements of curved LED Modules are present, that for the inner arrangement and outer arrangement of curved LED Modules a respective type of dedicated curved LED Module is provided, wherein said respective types of curved LED Modules are mutually different, i.e. not identical. This invention describes curved LED Module and luminaire features that can serve for a wide range of luminaires according to the invention in which diversity is reduced, with known benefits as savings on cost and resources for maintenance of the portfolio.

Typically the curved LED Module according to the invention has the technical features of having a curved shape with its main surface extending in a plane Q and a width W transverse to its curve, wherein the LED Module covers an arc segment of a circle 0, only the outer boundary range and not the whole surface, which normally is called a disc, with a radius Rc, wherein 120 mm<=Rc<=450 mm, and wherein the LED Module extends over an angle $\alpha$ over said circle, wherein 30°<=$\alpha$<=90°, preferably 36°<=$\alpha$<=72°;

- the number of LEDs N is at least Nmin and at most Nmax, wherein Nmin=3 and Nmax=150;
- the LEDs are evenly arranged at a respective pitch between adjacent LEDs and in at least one row on the PCB; and Further features of the LED Module can be that each LED has a respective lens positioned on an optical axis of an associated LED die accommodated in a cavity in a lens base of the lens having an inner, light entry surface for coupling light from the LED die into the lens, the lens has a circular, concave light exit surface around the optical axis and opposite the lens base, the concave light exit surface being surrounded by a convex light exit surface to render the LED during operation to emit a rotational symmetric batwing beam with a maximum intensity Imax of the batwing beam at an angle $\beta$, wherein 60°<=$\beta$<=80° with said optical axis, and a FWHM in the range of 15-30°.

The curved LED Module has a curved or kinked contour and alternatively is referred to as bent LED Module or simply LED Module. Similarly, a curved PCB is alternatively referred to as bent PCB. The curve may, for example, be according to an arc segment, an ellipse segment, a parabola segment, or a polyline, such as according to a single or multiple kinked shape. The curve of the LED Module respectively PCB typically is only in one plane, i.e. a flat object like the curved LED Module and curved PCB is not given a larger 3D dimension as a result of it being curved. The lens shape can more or less be described as a doughnut shape with a central cavity as a light entry surface on a lens base side of the lens, and a smooth, central recess at a light exit surface of the lens, or in other words a convex light exit surface with a central concave portion.

The pattern in which the LEDs with lenses are positioned and their typical emission beam profile and direction is preferred for a desired uniform luminance of the light exit window. Because of that, in prior art devices each luminaire has its own dedicated LED Module. The invention describes one LED Module that can serve a wide range of luminaire geometries, which reduces diversity with known benefits as savings on cost and resources for maintenance of the portfolio. On top of that, the LED Module according to the invention needs less PCB material, which reduces cost. In a basic embodiment of the LED Module only one LED color is used. In other embodiments multiple LED colors, for example LEDs of at least two different type in emission spectrum are applied.

The curved LED Module may have the feature that the number of LEDs comprise a plurality of LED subsets, wherein essentially each LED subset has the same number and same type of LEDs and each LED subset consists of LEDs of at least two different type in emission spectrum. In a basic embodiment of the LED Module only one LED color is used. In other embodiments multiple LED colors, for example LEDs of at least two different type in emission spectrum are applied. For example, two different color temperature White1+White2, wherein, for example, White 1 is warm white having a color temperature of about 2500K and White 2 is cool white having a color temperature of about 5000K. Other examples of combinations of different types of LEDs are White1+White2+Lime LEDs, Red+Green+Blue LEDs, Red+Green+Blue+White3 LEDs, wherein, for example, White 3 has a color temperature of about 3000K, or Red+Green+Blue+White+Amber LEDs.

The inventive curved PCB, curved LED Module and luminaire involves the following advantages:

- Low diversity in number of Stock Keeping Units (SKU) as only one type of LED Module is needed for a broad range of luminaire geometries, instead of two or more types of known LED Modules;
- Relatively low costs due to effective use of the curved PCB surface area by a curved arrangement of LEDs mounted thereon;
- Acceptably effective use and acceptably costs of PCB material by efficient nesting of curved PCB's in a PCB panel;
- Because of the beam emission profile and beam direction of the LEDs, as well as the balanced arrangements of LED Modules inside the luminaire a relatively good uniformity of the light exit window is obtained, also for luminaires with low thickness, i.e. <=50 mm thick;
- By a suitably profiled stepped profile of the base of a luminaire in combination with the specific beam emission profile of each LED, electronic components, for example a Power Supply Unit (PSU) can be placed inside the optical cavity.

The curved LED Module may have the feature that the LEDs are arranged on the PCB at an average pitch Pavg between LEDs, the respective pitch between adjacent LEDs is minimally Pmin and maximally Pmax, wherein Pmin=5 mm and Pmax=100 mm, with a ratio Emax=Pmax/Pavg being at the most 1.4 and a ratio Emin=Pmin/Pavg being at least 0.4. The maximum LED pitch Pmax in practice is at the most 100 mm but should not exceed 1.4*Pavg, and preferably not exceed 1.2*Pavg, as a larger Pmax involves an enhanced risk on dark areas and/or non-uniformity as with a larger pitch there is a risk on the overlap of the light from one LED with light from an adjacent LED is insufficient, resulting in said dark area and/or non-uniformity. There is no indication of a minimum (smallest) LED pitch, Pmin, but Pmin is typically defined by the size of the lens of the LED die and in practice is at least 5 mm. If LEDs of multiple colors are used, for example three colors, the equal pitch requirement preferably is applied for each color separately. This then means that the total number of LEDs a row of LEDs on each curved LED Module preferably is an integer multiple of three. Generally this understanding could be phrased as that when the number of LEDs comprises T different types of LEDs the number of N LEDs of an LED Module is an integer multiple of T. It is preferred to use only white LEDs on the outer corners of the LED Module. In smaller luminaires the LEDs on the outer corner are close to the edge. This is not a problem with white LEDs, but with colored LEDs there is a risk that colors will be observed.

The invention is applicable to curved LED Modules with LEDs of one or more colors (e.g. warm white, cool white, lime, RGB). If the curved LED Module comprises more than one row of LEDs, the conditions on pitch preferably apply to each color individually and for each row.

The curved LED Module may have the feature that the curved LED Module has a length L, wherein 180 mm<=L<=280 mm. The length of the LED Module in combination with the radius Rpcb of the curved PCB determine the curvature of the PCB. If the radius Rpcb is too large and the length L to small, an almost nearly straight line of LEDs of the LED Module would result, which results in too much deviation in small luminaires. On the other hand, if Rpcb is too small and the length L too long, this would result in too much deviation in larger luminaires and adds cost for PCB material.

The curved LED Module may be further optimized in shape and size for being suitable for a wider range of luminaires. Thereto the curved LED Module may have more narrow specified features, i.e. Nmin=12 and Nmax=36, and/or that 50°<=α<=70°, and/or that 65°<=β<=75° and FWHM in the range of 18°-24°, and/or that 5 mm<=W<=65 mm, preferably 20 mm<=W<=50 mm, and/or that the curve of the LED Module itself is curved according to an arc segment, the curve having a curvature with a radius Rpcb, wherein 200 mm<=Rpcb<=450 mm.

The curved LED Module may have the feature that the number of LEDs are arranged on the main surface in at least two, essentially parallel rows, each row comprising at least nine LEDs and each row extending essentially according to the curve or curvature of the LED Module.

As described above, the luminaire comprises a housing with a base having a first carrier surface and opposite to said first carrier surface a cover arranged in a light exit window of the luminaire, for example at least four, curved LED Modules of the type described above are evenly arranged at said first carrier surface and facing with the LEDs towards the light exit window and being screened (from direct view) by said cover. In order to uniformly illuminate the light exit window of a diffuse luminaire of a certain shape and size, some optical constraints or best practices have been found, i.e.:

- The diffuser should be lit uniformly, wherein the intensity preferably is somewhat higher in the center and somewhat decreasing towards the edges. This has the advantage that it provides a natural look.
- The diffuser should be diffuse enough that one cannot directly look through it and see the LEDs.
- The LEDs should be equally spaced on the circles where they are placed. The maximal pitch has been determined experimentally using the correct diffuser and the correct luminaire diameter. The minimal pitch is when the lenses (almost) touch each other. When more light is needed than can result with this minimal pitch, an additional ring of LEDs should be added.
- The position and diameter of the circles of LED Modules depends on the diameter of the luminaire.

If more than one color of LEDs is used each of the LED types should be equally spaced, resulting in alternating LED types.

The distance between the different types/colors of LEDs should be relatively small to ensure proper color mixing.

If more than one circle of LEDs is used, the pitch between the LEDs does not have to be the same in each of the circles.

The sides of the luminaire preferably are made of specific material, i.e. that area where the light incidentally can directly fall upon preferably is either reflective (white), or preferably consists of a double layer of diffusers (spaced some distance apart) to attain that unmixed light that reaches those zones does not result in colored spots visible on the sides. The material properties of the top part of the sides, and the front of the luminaire can be more transparent.

The shape of the luminaire can be tapered from center to edge, to make the sides thinner than the center to render the luminaire to appear thinner.

The LED Module circle diameter is defined by creating an average continuous circular LED pitch between multiple LED Modules. The lens pitch between the end lens of a first LED Module and the start lens of an adjacent second LED Module must be as equal as possible to the lens pitch between lenses on a single LED Module. A slight unroundness of the LED Module circle diameter has no (significant) observable optical effect on uniformity.

The luminaire may have the feature that the luminaire comprises a circular light exit window with a diameter Dl and comprises at least seven LED Modules of which at least five of said LED Modules are arranged to form a circle configuration with a diameter Dc around a central arrangement of at least two LED Modules, wherein 1.2<=Dl/Dc<=1.6.

The luminaire may have the feature that said circle configuration has a radius Rc, wherein Rc=0.5*Dc, and wherein 120 mm<=Rc<=450 mm.

The luminaire may have the feature that the central arrangement has a radius Ra and is surrounded by at least one further, essentially concentric circle configuration of curved LED Modules, wherein each subsequent further circle configuration increases in diameter by Ri, wherein 1.8*Ra<=Ri<=2.2*Ra. Hence, in radial direction from center outwards, the first circle configuration has diameter Dc of about 2*Ra, the second circle configuration has a diameter of about 4*Ra, the third circle configuration has a diameter of about 6*Ra, etc.

The luminaire may have the feature that the base has a stepped height profile with a highest portion, considering the orientation of the luminaire with the LEDs facing upwards with respect to gravity, creating a cavity at a second carrier surface of the base opposite to the first carrier surface. Such a cavity has the advantage of providing a location for (unobtrusive) accommodation of a PSU. The luminaire typically is applied as a ceiling luminaire with the LEDs facing downwards with respect to gravity, the cavity is then preferably located above a lowest portion of the stepped profile, the base thus shielding an electronic component accommodated in the cavity, such as a PSU, from view through the light exit window. Typically such highest (or lowest) portion of the base is located closest to the light exit window when viewed in a direction along the optical axis.

BRIEF DESCRIPTION OF THE DRAWINGS

The invention will now be further elucidated by means of the schematic drawings in which some features may be exaggerated for the sake of clarification. The drawings are by no means intended to limit the scope of the invention, but rather are intended to show the ample possibilities thereof. In the drawings:

FIGS. 9A-F show some embodiments of luminaires according to the invention; and FIG. 10 shows efficient use of PCB material for mounting LEDs on curved PCB's.

DETAILED DESCRIPTION OF PREFERRED EMBODIMENTS

Figure 1A:
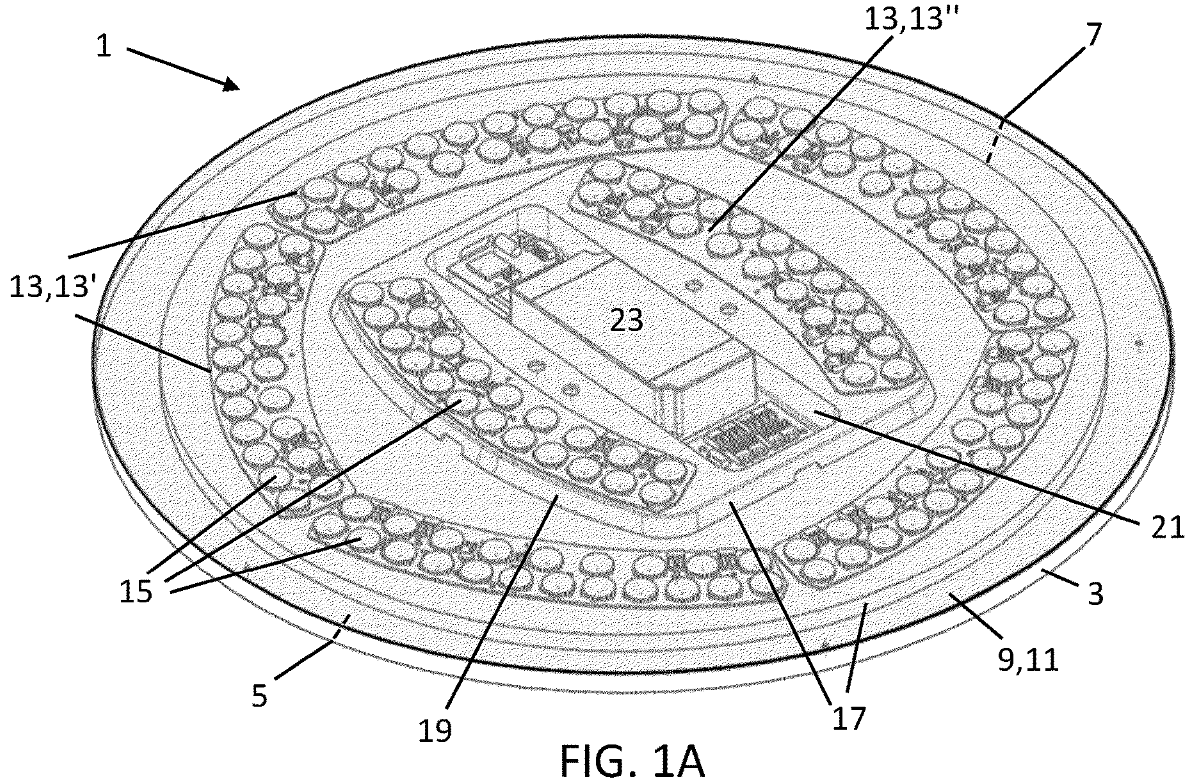
FIGS. 1A-B show two different embodiments of luminaires according to the invention.
Figure 1B:
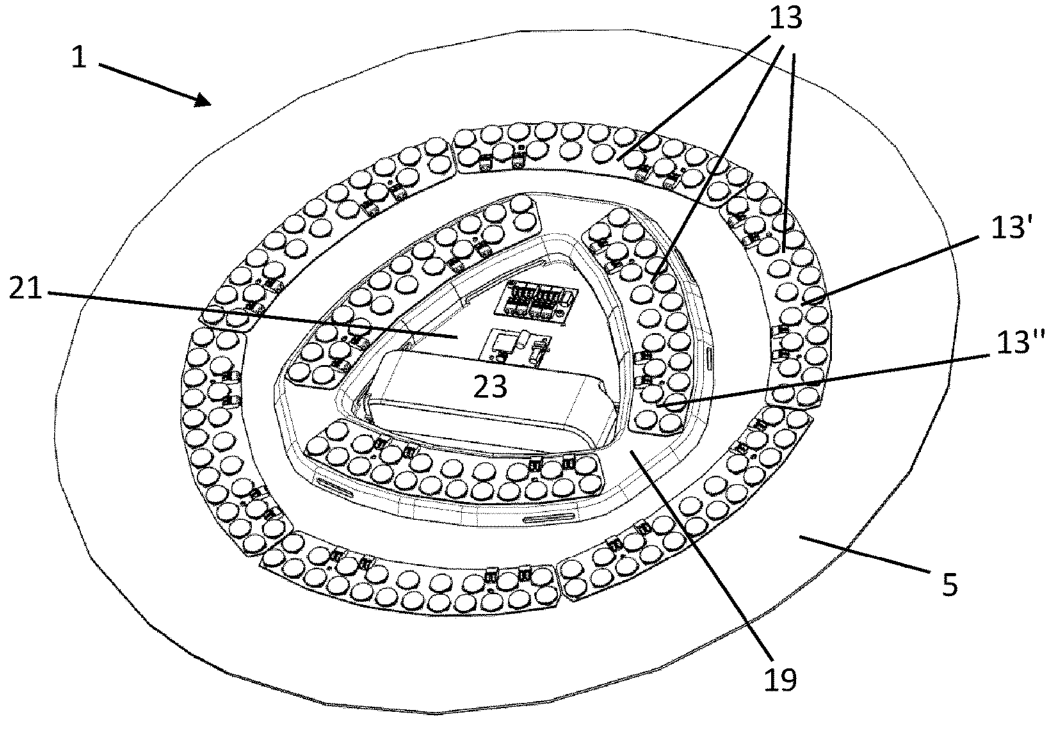

FIG. 1A shows a first embodiment of a luminaire 1 according to the invention. The luminaire comprises a housing 3 with a base 5 having a first carrier surface 7 and opposite to said first carrier surface a cover 9 arranged in a light exit window 11 of the luminaire. In the figure the cover is shown as a transparent grey cover instead of as being a diffusely translucent cover for the sake of clarity and to enable a view of the arrangement of seven curved LED Modules 13 which are evenly arranged at said first carrier surface and facing with LEDs 15 towards the light exit window (and normally being screened from direct view by said cover to persons/users). The base has a stepped height profile 17. Five curved LED Modules 13' of the seven curved LED Modules are arranged in a circle arrangement thereby surrounding two centrally arranged curved LED Modules 13" that are arranged on an elevated, central portion 19 of the stepped profile of the base. In between the two centrally arranged curved LED Modules the central portion of the base has a recessed portion 21 in which a PSU/driver 23 is accommodated for individually driving and controlling the LEDs and/or curved LED Modules. Both the curved LED Modules and the PSU/driver are mounted on the same side of the base, though it is alternatively possible that the PSU/driver is arranged in an unobtrusive manner on an opposite side of the base than the side on which the LED Modules are mounted. FIG. 1B shows a second embodiment of a luminaire 1 according to the invention comprising nine curved LED Modules 13 evenly mounted on a base 5 of the luminaire. Six out of nine curved LED Modules 13' are arranged in a circle arrangement thereby surrounding three centrally arranged curved LED Modules 13" that are symmetrically arranged on an elevated, central portion 19 of the stepped profile of the base. In between the three centrally arranged curved LED Modules the central portion of the base has a recessed portion 21 in which a PSU/driver 23 is accommodated for individually driving and controlling the LEDs and/or curved LED Modules.

Figure 2A:
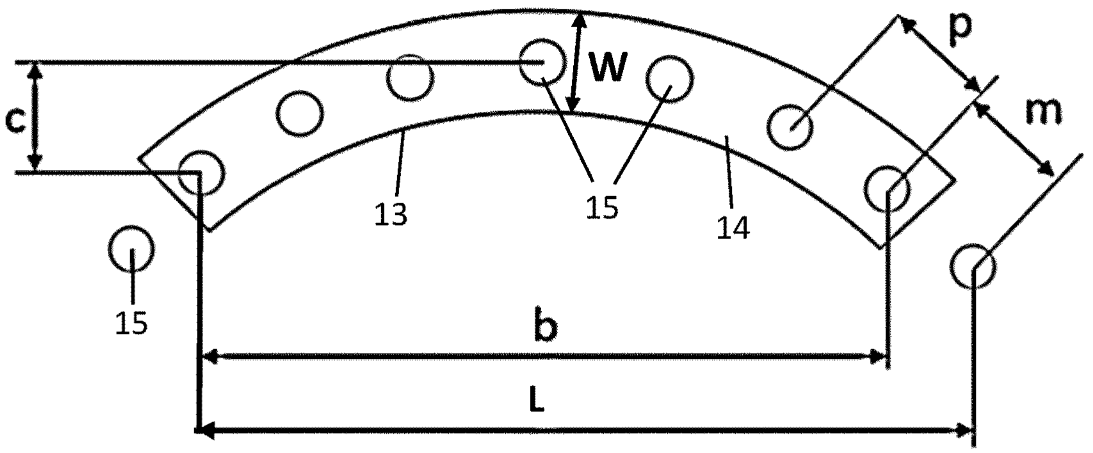
FIGS. 2A-C shows the basic parameters of a curved LED Module according to the invention.
Figure 2B:
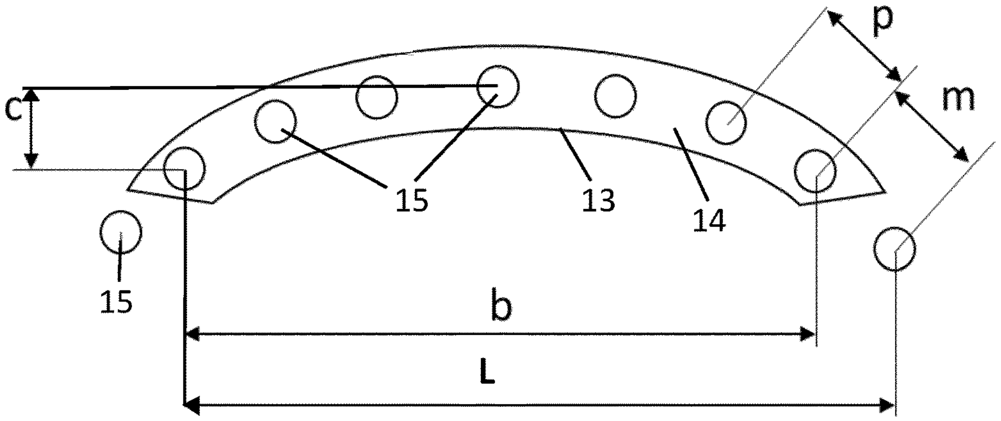
Figure 2C:
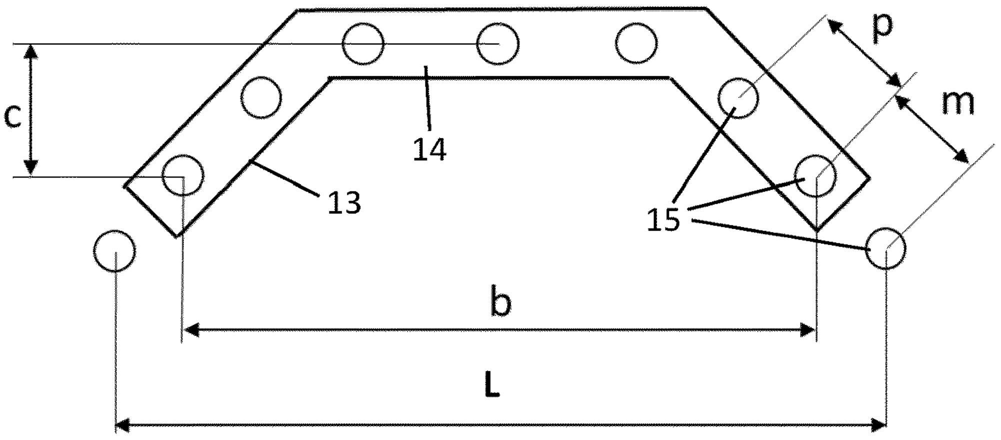

FIGS. 2A-C schematically shows the basic parameters of a curved LED Module 13 according to the invention. In the figures the curved LED Module comprises only a single row of seven LEDs 15 mounted on a PCB 14 and is shown respectively as a curved LED Module in the shape of an arc segment, according to a segment of an ellipse, and according to a polyline, e.g. according to a single or multiple kinked shape. These basic parameters relate to geometrical boundaries of the LED Module, and for example comprise:

A LED-pitch "p" is preferably equal over the full curve of the LED Module over the full circle in the luminaire and on average is Pavg. The geometry of the LED Module should support this pitch, i.e. not too much PCB material outside of the LEDs in the extended direction of the curve, which relates to "m", which is the maximum pitch, i.e. Pmax, between adjacent LEDs. The maximum LED pitch Pmax in practice is at the most 100 mm but should not exceed 1.4*Pavg, and preferably not exceed 1.2*Pavg, as a larger Pmax involves an enhanced risk on dark areas and/or non-uniformity as with a larger pitch there is a risk on the overlap of the light from one LED with light from an adjacent LED is insufficient, resulting in said dark area and/or non-uniformity. There is no indication of a minimum (smallest) LED pitch, Pmin, but Pmin is typically defined by the size of the lens of the LED die and in practice is at least 5 mm.

The curved LED Module has a useful length which is defined as the pitch "L" between two adjacent LED Modules, wherein L≈b+p, wherein L=useful LED Module length, between 180-280 mm, but preferably 230 mm;

b=distance between first and last LED on a single curved LED Module;

p=average LED pitch.

Shorter LED Modules could result in too much assembly (e.g. LEDs on star-board), longer LED Modules would exclude the use of the curved LED Module in relatively small luminaires.

The radial distance of LED on a single LED Module, which is a measure of the degree of bending of the curved LED Module (or in other words, of the curvature of the LED Module). Said radial distance is determined via parameter "c", wherein c typically could range from 15 mm to 30 mm, but preferably c=20 mm±2 mm. With "c" being smaller than 15 mm, this would result in a nearly straight line of LEDs, which results in too much deviation in small luminaires. With "c" being larger than 30 mm this would result in too much deviation in larger luminaires and adds cost for PCB material.

Figure 3A:
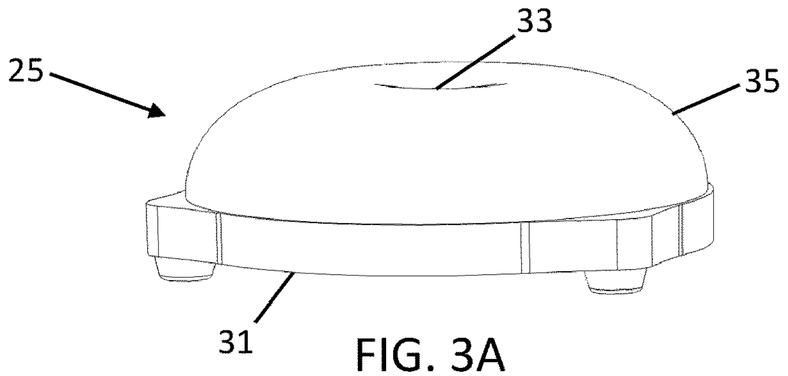
FIGS. 3A-C show perspective top and bottom view and cross-sectional side view of a lens of a curved LED Module according to the invention.
Figure 3B:
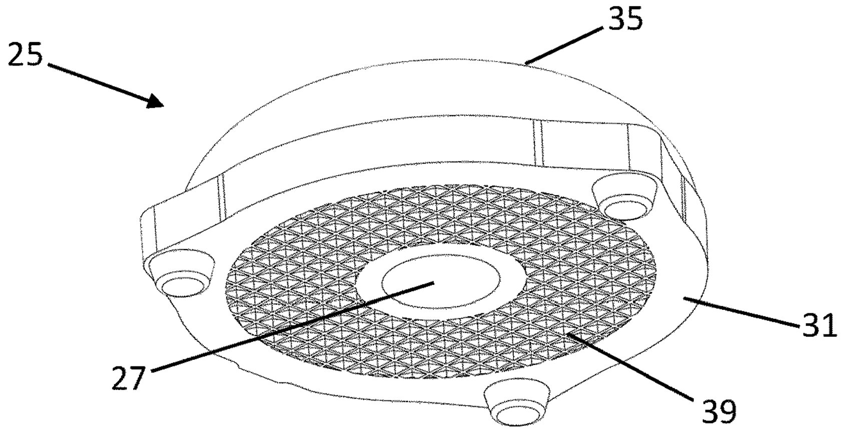
Figure 3C:
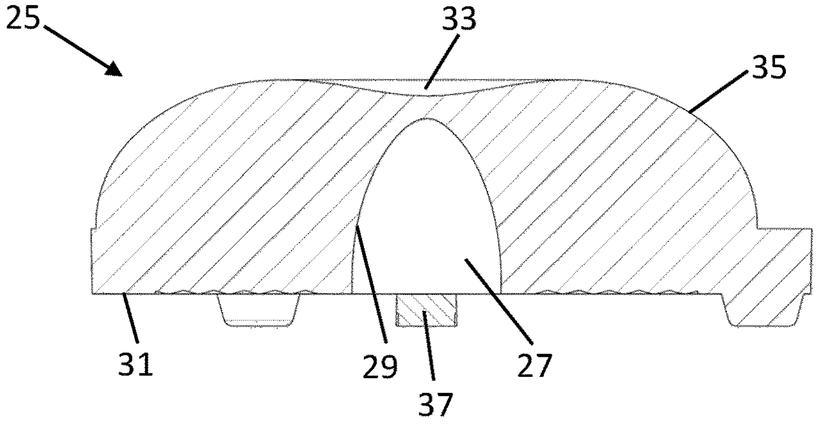

FIGS. 3A-C show a perspective top and bottom view and a cross sectional view of a lens 25 of a LED as mounted on a PCB of a curved LED Module according to the invention. The lens shape can more or less be described as a doughnut shape with a central cavity 27 providing a light entry surface 29 on a lens base side 31 of the lens and a smooth, central indent 33 at a light exit surface 35 of the lens, or in other words a convex light exit surface 35 with a central concave portion 33. In the central cavity of each lens at least one associated LED die 37, which could be a single or a plurality of LED dies, for example RGB LED dies, is accommodated. As shown in FIG. 3B the base side is at least locally provided with a scattering structure 39 to hide the PCB and/or to enhance mixing and/or uniformity of light emitted by the LED die, for example when RGB LED dies are accommodated in the cavity. Note that the scattering structure is not an essential feature but rather is optional.

Figure 4A:
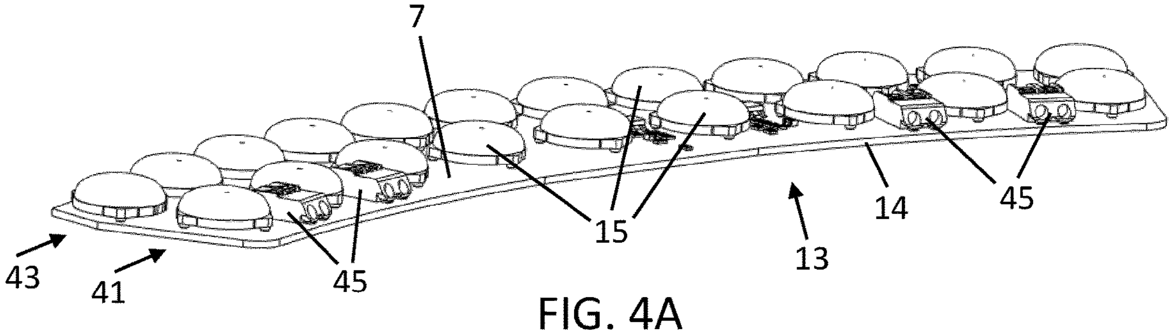
FIGS. 4A-B show a perspective view and a top view of an embodiment of a curved LED Module according to the invention and their mutual connection.
Figure 4B:
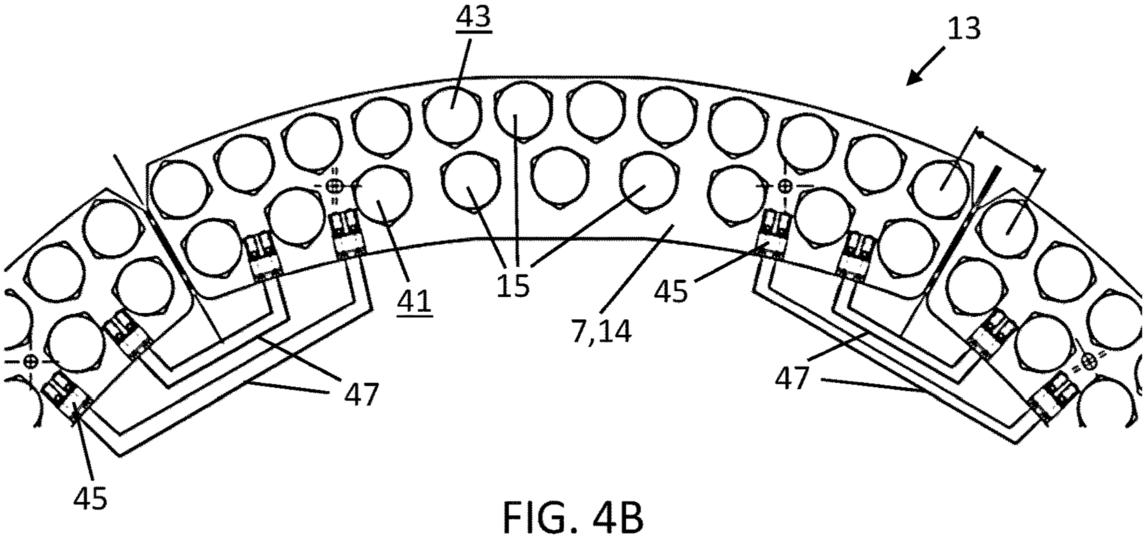

FIGS. 4A-B show a perspective view and a top view of an embodiment of a curved LED Module 13 according to the invention and their mutual connection. In the embodiment shown in FIGS. 4A-B a number of LEDs 15 are arranged on a main first carrier surface 7 of PCB 14 in at least two, essentially parallel rows, each row comprising at least nine LEDs, i.e. an inner row 41 comprises nine LEDs and an outer row 43 comprises twelve LEDs, with each row extending essentially according to the curve of the LED Module. As shown, the LED Modules each have connectors 45 with respective connecting wires 47 enabling easy, electrically throughput connection of adjacent LED Modules. Said connectors can be placed on the LED Module for loop-through of the electrical connection, for example to make a 'string' of LED Modules, which is easier for assembly.

Figure 5:
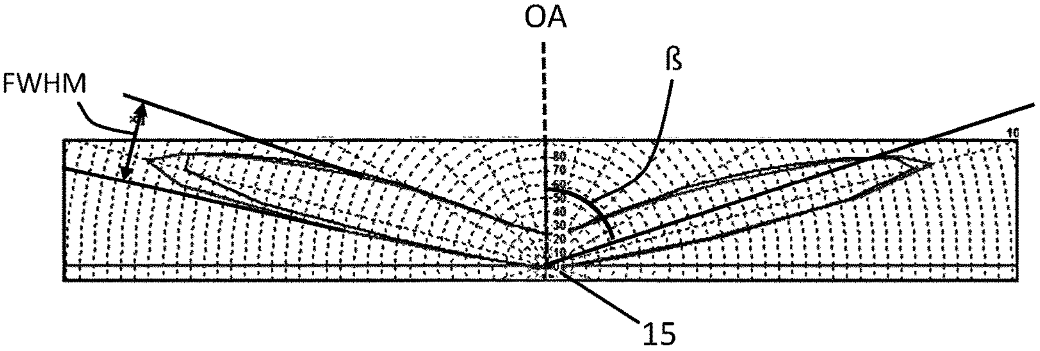
FIG. 5 show a cross section of the typical beam emission of a LED-die provided with the lens of FIGS. 3A-B.

FIG. 5 show a cross section of the typical beam emission of a LED 15, comprising a LED die and the lens of FIGS. 3A-B. The intensity distribution of the LED should preferably be a batwing light distribution which is preferably rotational symmetric around a respective optical axis OA of an associated respective LED. The beam angle β, i.e. the direction of the highest beam intensity, preferably is between 60 degrees and 80 degrees from the optical axis, in the figure β is about 70 degrees. The full-width-at-half-maximum FWHM of the emitted beam preferably is around 20 degrees, and between 15 and 30 degrees. The figure illustrates the intensity profile of a suitable lens. A too small FWHM width of the peaks would result in bright rings around the LEDs. A too wide peak would result in less mixing. The LED-pitch as defined for the curved LED Modules guarantees and overlap of the light from multiple LEDs. The configuration of LED Modules leads to a pitch, said pitch has a value that is the largest of the value of the LED-pitch and the value of the radial distance between LED Modules located at different radial distances from the optical axis, such as the difference in radial distance from the optical axis of concentric rings. A pitch-to-height ratio in this application typically is about 1.2, which can be considered as the preferred pitch-to-height ratio, wherein the height is the distance along the optical axis between the PCB and the light exit window or the diffuser, if present. The pitch-to-height ratio should not be higher than 1.5 as higher values result in non-uniformity, due to insufficient overlap of the light of multiple LEDs. The pitch-to-height ratio should not be less than 0.5 as this would result in undesired and/or unnecessary deep/high/thick luminaires. A diffusive cover provided over the LED Module, for example as shown in FIG. 1A, preferably is a Lambertian diffuser and no light should be transmitted un-scattered to avoid direct visibility of LEDs and lenses through the diffusive cover. Preferably, the diffusive cover should not absorb too much light, as this has a negative impact on the optical efficiency.

Figure 6A:
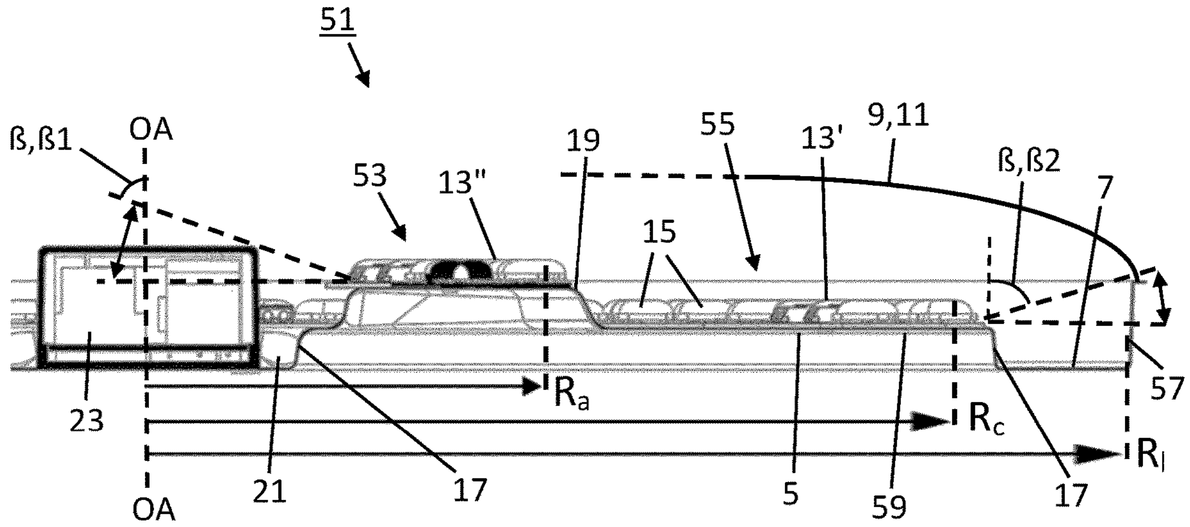
FIGS. 6A-B show schematic cross sections through a luminaire according to the invention and beam emission profile.
Figure 6B:
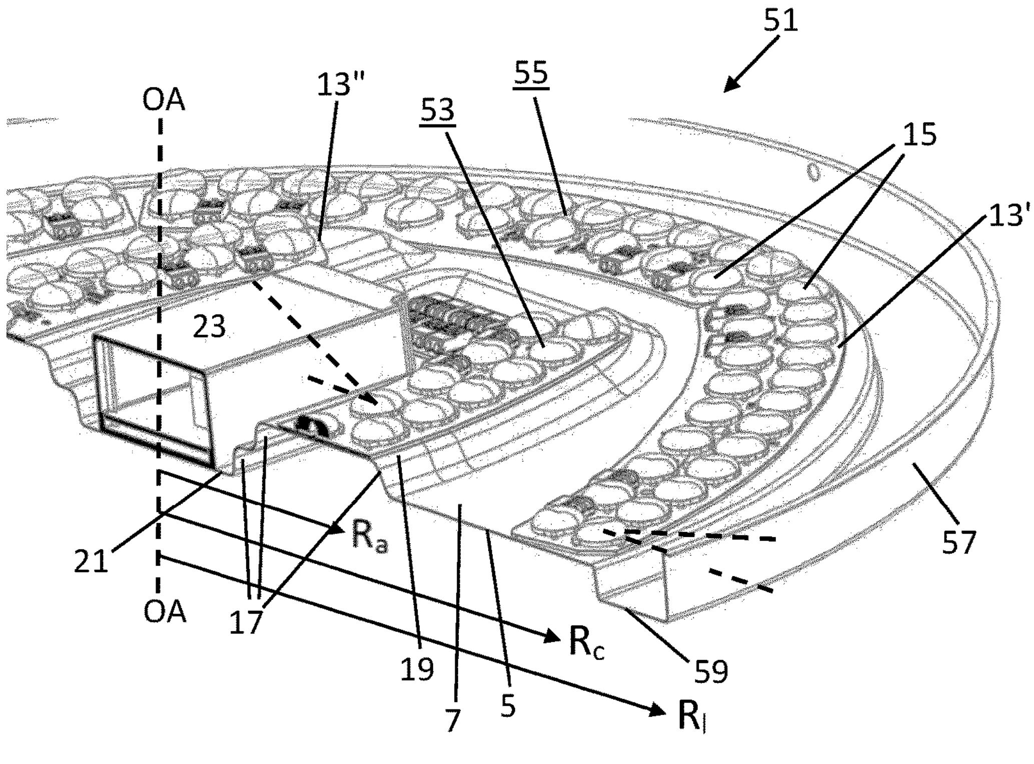

FIGS. 6A-B respectively schematically show a transverse and a perspective partial cross section through a luminaire 51 according to the invention and indicate the typical desired specification with respect to the angle β of the direction of the batwing beam emission profile. The luminaire comprises a power supply unit (PSU) 23 in a central recessed portion 21 of a base 5 of the luminaire. The PSU is surrounded by a relatively centrally positioned central arrangement 53 of inner LED Modules 13" and a further circle arrangement 55 of circular arranged further LED Modules 13' arranged around the central arrangement. The inner LED Modules are arranged about a distance $R_a$ around the optical axis OA, the further circle arrangement has a radius $R_c$ and the luminaire has a radius $R_l$. The luminaire has an outer rim 57 to which a cover 9 is mounted, said cover extends over the LED Modules and PSU and forms a light exit window 11 of the luminaire. The outer rim is connected to the base 5, in the figure integrally formed with the base, but alternatively this can be separate parts. The base has a stepped height profile 17 with a central lowest portion 21 (with LEDs 15 facing upwards with respect to gravity) surrounded by a highest, elevated portion 19 of the arrangement of inner LED Modules, thus creating the recess 21 at a first carrier surface 7 of the base accommodating the PSU. Alternatively the central portion is the highest portion for accommodating the PSU in an unobtrusive manner in a recess at a second carrier surface 59 opposite the first carrier surface. The height positions of the LED Modules and LEDs with respect to the PSU and the rim of the luminaire in combination with the specific beam profile and direction of the beam issued by the LEDs (as explained with respect to FIG. 5) is such that said beam just passes along said PSU, beam direction/angle with optical axis is $\beta 1$, and said rim, beam direction/angle with optical axis is $\beta 2$. As preferably/typically one type of LED Modules is applied in the luminaire of the invention, $\beta 1=\beta 2=\beta$. Alternatively or additionally, the recess and/or the LED Module may contain other electronic components, such as power supply, antenna, LED controller, connectors, etc.

Figure 7:
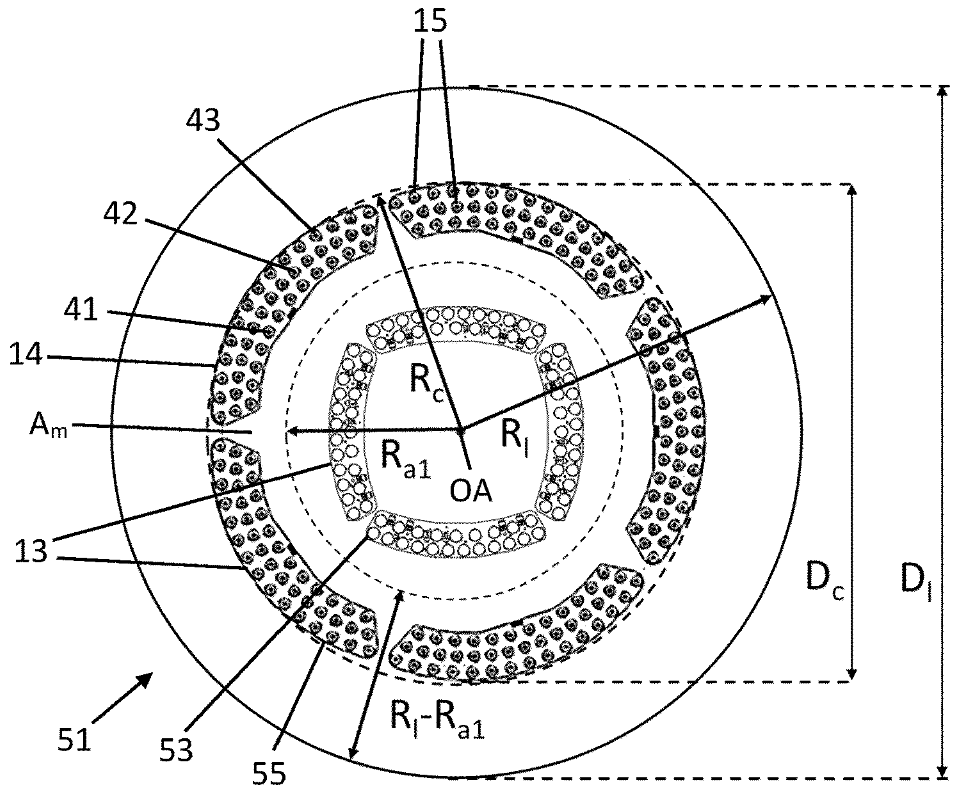
FIGS. 7 and 8 show some basic parameters of curved LED Modules arrangement in a luminaire according to the invention.
Figure 8:
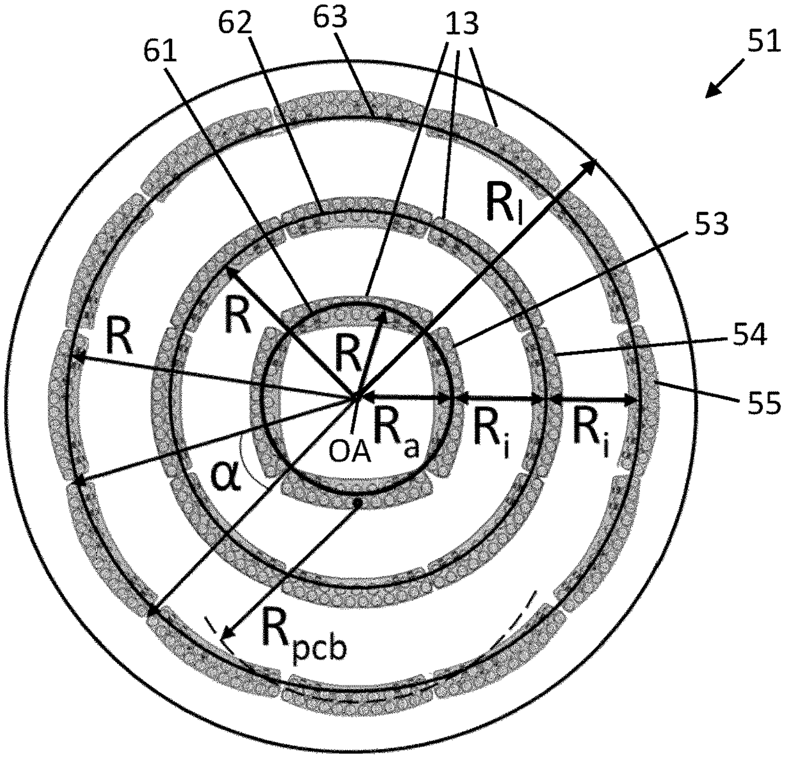

FIGS. 7 and 8 show some basic parameters for arrangements of curved LED Modules 13 in luminaires according to the invention. In FIG. 7 a circular luminaire 51 having a diameter Dl is shown, the concentric arrangement of light emitting LED Modules inside the luminaire around the optical axis OA cover an area Am with a diameter Dc, wherein Am is $0.5*\pi*Dc^2$. A ratio Dl:Dc preferably is in a range of 1.2-1.6 to ensure a uniform appearance of the light exit window/cover (not shown) of the luminaire. The required number of LED Modules to be used and whether more than a single circular arrangement of LED Modules is required for the luminaire depends on the size (or diameter Dl) of the luminaire. In the embodiment of the luminaire shown in FIG. 7 two concentric circle arrangements 53,55 are provided, the LED Modules in the outer circle arrangement 55 each have three, substantially parallel extending rows 41,42,43 of LEDs 15 mounted on the PCB 14 according to the curvature of the curved PCB. Typically, if the circle arrangement of circularly arranged LED Modules in the luminaire becomes larger, for example larger than 170 mm, an additional arrangement, for example a circle arrangement, of inner LED Modules within said larger circle arrangement should be provided to counteract a too low luminance in the center of said luminaire. In the luminaire shown in FIG. 7, the inner modules each have two substantially parallel extending rows of LEDs mounted on the PCB. The roundness of the additional more centrally arranged of inner LED Modules is less critical due to the local mixing effect of many LEDs. The number of LED Modules can be defined by calculating the surface of the luminaire Al according to $Al=\pi*Rl^2$, wherein each LED should cover a substantially equal size of surface area. As shown in FIG. 7 the luminaire comprises two concentrically arranged substantially circular arrangements of LED Modules. The inner circle arrangement of LED Modules has to illuminate a surface area of the cover of $A1=\pi*Ra1^2$, while the outer circle arrangement of LED Modules has to illuminate a surface area of the cover A2, wherein $A2=\pi*(Rl^2-Ra1^2)$. Further to this, it is preferred that in the inner arrangement should not cover a larger surface area than the outer arrangement, i.e. A1:A2<M:L, where A1: surface area for the inner arrangement of LED Modules;

A2: surface area for the outer circle arrangement of LED Modules;

L: number of LED Modules in the outer arrangement; and

M: number of LED Modules in the inner arrangement.

FIG. 8 shows an example of circle arrangements of LED Modules for luminaires requiring at least three concentric circular arrangements of LED Modules around an optical axis OA. In the luminaire 51 shown in FIG. 8, the same type, i.e. only one type, of LED Module 13 is used for all the circular arrangements 53,54,55. The most inner circular arrangement 53 of LED Modules has a respective radius R, R being Ra, each subsequent further circular arrangement 54,55 of LED Modules has an increase in the radius by Ri, wherein $Ri\approx Ra$, i.e. $1.8*Ra<=Ri<=2.2*Ra$. Hence, the second circle arrangement 54 of LED Modules has a respective radius R of $Ra+Ri\approx 2*Ra$, and the third circle arrangement 55 of LED Modules has a respective radius R of $Ra+2*Ri\approx 3*Ra$. FIG. 8 further shows that the LED Module has a specific own curvature, wherein said curvature is substantially arc shaped and wherein the arc is part of a circle having a radius Rpcb. Said radius Rpcb and the width W of the LED Modules is chosen such that a wide range in diameters of circles 61,62,63, having a radius Rc, of circular arrangements of LED Modules can be covered by the LED Modules, i.e. the radii of said range of diameters typically have values in the range of 120 mm<=Rc<=450 mm. Rpcb typically is larger than Ra and typically smaller than Ra+2*Ri. As shown, all LED Modules are identical and extend over a respective angle $\alpha$ of a respective circle. As the LED Modules are the same for each circle arrangement of the luminaire, the angle $\alpha$ over which a LED Modules extends changes with the size of the circle. In the most outer circle arrangement 55 each LED Module extends over an angle $\alpha$ of 30°, while in the most inner circle arrangement 53 each LED Module extends over a respective angle $\alpha$ of 90°, and in the middle circle arrangement 54 each LED Module extends over an angle $\alpha$ of 45°.

FIGS. 9A-F shows some embodiments with various arrangements of LED Modules which can be applied in luminaires according to the invention. The given embodiments are just examples, other LED Module arrangements with different numbers of LED Modules are possible for luminaires having the same diameter/size. FIG. 9A shows the arrangement of LED Modules for a circular luminaire having a diameter of 500 mm comprising an inner arrangement 53 of LED Modules concentric with a circular outer arrangement 55 of LED Modules. FIG. 9B shows the arrangement of the LED Modules for a circular luminaire having a diameter of 650 mm comprising an inner arrangement 53 concentric with a circular outer arrangement 55. FIG. 9C shows the arrangement of the LED Modules for a circular luminaire having a diameter of 750 mm comprising an inner arrangement 53 concentric with a circular outer arrangement 55. FIG. 9D shows the arrangement of the LED Modules for a circular luminaire having a diameter of 850 mm comprising an inner circular arrangement 53 concentric with a circular outer arrangement 55. FIG. 9E shows the arrangement of the LED Modules for a circular luminaire having a diameter of 900 mm comprising an inner circular arrangement 53 concentric with a circular outer arrangement 55. FIG. 9F shows the arrangement of the LED Modules for a rectangular luminaire (square in this case) of 600 mm*500 mm in which the inner arrangement 53 is non-rotational symmetric with respect to the outer arrangement 55. In all the examples given in FIGS. 9A-F, the same, single type of LED Module is used. Thus, is exemplified that the invention describes one LED Module that can serve a wide range of luminaire geometries, which reduces diversity with known benefits as savings on cost and resources for maintenance of the portfolio.

EXAMPLE

Chosen is for an architecture based on 3-channel 24V. The smallest LED Module consists of three types of LEDs with seven LEDs of each type, i.e. in this case 2200K as a warm white LED, 6500K as a cool white LED, and lime LEDs. Hence, the smallest module comprises in total twenty-one LEDs. Furthermore, each larger LED Module has an integer multiplication of twenty-one LEDs, i.e. 42, 63, 84 . . . The different colored LEDs renders the LED Module to be tunable white, yet note that tunable white is not directly related to the invention, the invention is also relevant for a fixed color correlated temperature (CCT). Having LEDs in 2 or more colors/CCT's can be considered an additional embodiment. In this case uniformity becomes more critical than with fixed CCT, because the eye is more sensitive to color variations than to intensity variations. Based on this smallest unit cell several scenarios for LED-selection have been calculated and evaluated on technical feasibility, cost and best match requirements for light output and geometry. This resulted in a luminous flux of about 650 lm for each LED Module with seven LEDs of each color. Considering an optical efficiency of about 80% this results in a minimum number of LED Modules required to generate the required light output for each geometry/size, as listed in table 1.

TABLE 1

Examples of luminaires.

| | Luminaire geometry | | | | | |
|---|---|---|---|---|---|---|
| | Ø850 mm | Ø650 mm | Ø500 mm | Ø350 mm | 500 × 500 mm | 950 × 650 mm |
| Luminous flux | 6000 lm | 4500 lm | 3500 lm | 2000 lm | 3500 lm | 6000 lm |
| # of unit cells | 12 | 9 | 7 | 4 | 7 | 12 |

The best placement of the LEDs with lenses is if they are placed in concentric circles, with no gaps in the circles as especially regular patterns of missing LEDs in a circle tend to be visible. Hence, for some of the luminaires listed in table 1, an arrangement of the LED Modules in the luminaire has been simulate. Some of the embodiments by which good results were obtained are listed in Table 2.

TABLE 2

Optical simulation results/data.

| Luminaire diameter (mm) | Radial position of LEDs (mm) | Number of LEDs | Radial position of LEDs (mm) | Number of LEDs | Radial position of LEDs (mm) | Number of LEDs | Radial position of LEDs (mm) | Number of LEDs |
|---|---|---|---|---|---|---|---|---|
| 500 | 71 | 6 | 92 | 8 | 139 | 12 | 161 | 16 |
| 650 | 71 | 6 | 92 | 8 | 214 | 18 | 237 | 24 |
| 850 | 71 | 6 | 92 | 8 | 293 | 24 | 316 | 32 |

During further experiments with this configuration and with LED Module samples, it was found that the most critical is the closed outer ring with respect to uniformity of illumination of the light exit window, both with respect to brightness and color. The inner ring is less critical in this respect. In the center of the luminaire light mixing is relatively good. As a result, the inner 'ring' of LED Modules can be made with the same curved LED Modules as used for the further, more outer rings. Especially the round luminaires have a very good uniformity, for the rectangular luminaires, an acceptable uniformity is obtained, though not being as good as for the round versions.

FIG. 10 shows efficient use of PCB material 14 for mounting LEDs 15 on curved LED Modules 13. By a nested column arrangement of curved PCB's in a larger PCB panel and alternating orientation in a row of curved PCB's efficient use of PCB material with only little loss of material is attained.

The invention claimed is:

1. A luminaire comprising a housing with a base having a first carrier surface on which a plurality of LED Modules is arranged, and opposite to said first carrier surface a cover arranged in a light exit window of the luminaire, wherein each LED Module is a curved LED Module comprising a curved PCB having a main surface on which a number of N LEDs are mounted, wherein the LEDs are facing towards the light exit window and are screened by said cover, wherein the LED Modules are arranged as to comprise an inner arrangement of LED Modules surrounded by a concentric outer arrangement of LED Modules, and wherein all LED Modules are identical, wherein the light exit window is circular with a diameter Dl and comprises a plurality of evenly arranged curved LED Modules at said first carrier surface, a portion of said plurality of LED Modules are arranged as the outer arrangement to form a circle configuration with a diameter Dc around the central, inner arrangement of at least two LED Modules, wherein the outer arrangement includes a greater number of LED Modules than the inner arrangement, and wherein a ratio of DI:Dc is 1.2<=Dl/Dc<=1.6 to provide a uniform appearance of light in the light exit window of the luminaire.

2. The luminaire as claimed in claim 1, wherein the LED Module has a curved shape with its main surface extending in a plane Q and a width W transverse to its curve, wherein the LED Module covers an arc segment of a circle with a radius Rc, wherein 120 mm<=Rc<=450 mm, wherein the LED Module extends over an angle α over said circle, wherein 30°<=α<=90°, preferably 36°<=α<=72°, more preferably 50°<=α<=70°;

wherein the number of LEDs N is at least Nmin and at most Nmax, wherein Nmin=3 and Nmax=150; and wherein the LEDs are evenly arranged at a respective pitch between adjacent LEDs and in at least one row on the PCB.

3. The luminaire as claimed in claim 1, wherein each LED has a respective lens positioned on an optical axis of an associated LED die accommodated in a cavity in a lens base of the lens having an inner, light entry surface for coupling light from the LED die into the lens, the lens has a circular, concave light exit surface around the optical axis and opposite the lens base, the concave light exit surface being surrounded by a convex light exit surface to render the LED during operation to emit a rotational symmetric batwing beam with a maximum intensity Imax of the batwing beam at an angle β, wherein 60°<=β<=80° with said optical axis, and a FWHM in the range of 15-30°.

4. The luminaire as claimed in claim 1, wherein the LED Modules are arranged in an arrangement comprising a circular inner arrangement concentric around an optical axis with an outer circular arrangement.

5. The luminaire as claimed in claim 4, wherein the central arrangement has a radius Ra and wherein each subsequent further circle configuration increases in diameter by Ri, wherein 1.8*Ra<=Ri<=2.2*Ra.

6. The luminaire as claimed in claim 1, wherein the LED Modules are arranged in an arrangement comprising at least three concentric circular arrangements of LED Modules around an optical axis.

7. The luminaire as claimed in claim 1, wherein said circle configuration has a radius Rc, wherein 120 mm<=Rc<=450 mm.

8. The luminaire as claimed in claim 1, wherein the base has a stepped height profile with a highest portion creating a cavity at a second carrier surface of the base opposite to the first carrier surface.

9. The luminaire as claimed in claim 1, wherein the LEDs are arranged on the PCB at an average pitch Pavg between LEDs, the respective pitch between adjacent LEDs is minimally Pmin and maximally Pmax, wherein Pmin=5 mm and Pmax=100 mm, with a ratio Emax=Pmax/Pavg being at the most 1.4 and a ratio Emin=Pmin/Pavg being at least 0.4.

10. The luminaire as claimed in claim 1, wherein N is a multiple of T when the number of LEDs comprises T different types of LEDs.

11. The luminaire as claimed in claim 1, wherein the curved LED Module has a length L, wherein 180 mm<=L<=280 mm.

12. The luminaire as claimed in claim 1, wherein 5 mm<=W<=65 mm, preferably 20 mm<=W<=50 mm.

13. The luminaire as claimed in claim 1, wherein the curve of the LED Module itself is curved according to an arc segment, the curve having a curvature with a radius Rpcb, wherein 200 mm<=Rpcb<=450 mm.

14. LED Module suitable for use in a luminaire as claimed in claim 1, wherein the LED Module has a curved shape with its main surface extending in a plane Q and a width W transverse to its curve, wherein the LED Module covers an arc segment of a circle with a radius Rc, wherein 120 mm<=Rc<=450 mm, wherein the LED Module extends over an angle α over said circle, wherein 30°<=α<=90°, preferably 36°<=α<=72°, more preferably 50°<=α<=70°;

wherein the number of LEDs N is at least Nmin and at most Nmax, wherein Nmin=3 and Nmax=150;

wherein the LEDs are evenly arranged at a respective pitch between adjacent LEDs and in at least one row on the PCB;

wherein N is a multiple of T when the number of LEDs comprises T different types of LEDs, wherein 2<=T<=6.

15. LED Module as claimed in claim 14, wherein each LED has a respective lens positioned on an optical axis of an associated LED die accommodated in a cavity in a lens base of the lens having an inner, light entry surface for coupling light from the LED die into the lens, the lens has a circular, concave light exit surface around the optical axis and opposite the lens base, the concave light exit surface being surrounded by a convex light exit surface to render the LED during operation to emit a rotational symmetric batwing beam with a maximum intensity Imax of the batwing beam at an angle β, wherein 60°<=β<=80° with said optical axis, and a FWHM in the range of 15-30°.

16. The luminaire as claimed in claim 1, wherein the light exit window comprises at least seven evenly arranged curved LED Modules at said first carrier surface, at least five of said LED Modules are arranged as the outer arrangement to form the circle configuration and the inner arrangement of at least two LED Modules, wherein 1.2<=Dl/Dc<=1.6.

* * * * *